US006614480B1

United States Patent
Oda et al.

(12) United States Patent
(10) Patent No.: US 6,614,480 B1
(45) Date of Patent: Sep. 2, 2003

(54) APPARATUS AND A METHOD FOR AUTOMATICALLY FOCUSING ON A SUBJECT

(75) Inventors: Takahiro Oda, Tokyo (JP); Kenji Kadota, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/201,884

(22) Filed: Nov. 30, 1998

(30) Foreign Application Priority Data

Nov. 28, 1997 (JP) .............................................. 9-328275

(51) Int. Cl.[7] .............................................. G03B 13/00
(52) U.S. Cl. ........................ 348/351; 348/345; 348/353
(58) Field of Search ................................ 348/345, 346, 348/347, 348, 349, 350, 351, 352, 353, 354, 355, 356, 357

(56) References Cited

U.S. PATENT DOCUMENTS

| | | | | |
|---|---|---|---|---|
| 4,965,443 A | * | 10/1990 | Yamasaki et al. | 348/345 |
| 5,200,860 A | * | 4/1993 | Hirasawa et al. | 359/696 |
| 5,323,200 A | * | 6/1994 | Hirasawa | 396/81 |
| 5,512,951 A | * | 4/1996 | Torii | 348/345 |
| 5,614,951 A | * | 3/1997 | Lee et al. | 348/356 |
| 5,956,528 A | * | 9/1999 | Tanaka | 348/347 |
| 6,094,223 A | * | 7/2000 | Kobayashi | 348/354 |
| 6,373,525 B1 | * | 4/2002 | Nishiyama | 348/345 |
| 6,389,179 B1 | * | 5/2002 | Katayama et al. | 382/284 |

FOREIGN PATENT DOCUMENTS

| | | |
|---|---|---|
| JP | 62-272218 | 11/1987 |
| JP | 63-049717 | 3/1988 |
| JP | 05-145827 | 6/1993 |
| JP | 05-308556 | 11/1993 |
| JP | 06-086139 | 3/1994 |
| JP | 06-324254 | 11/1994 |
| JP | 07-113944 | 5/1995 |
| JP | 09-274130 | 10/1997 |

* cited by examiner

*Primary Examiner*—Wendy R. Garber
*Assistant Examiner*—Jacqueline Wilson
(74) *Attorney, Agent, or Firm*—Venable LLP; Michael A. Sartori; Jeffrey W. Gluck

(57) ABSTRACT

The present invention is an automatic focusing apparatus for automatically focusing on a subject in an image plane. The automatic focusing apparatus includes a focus lens for focusing on the subject, drive means for moving the focus lens, an image element for picking up image data from the subject through the focus lens, an image processor for extracting luminance signals of each pixel from the image data picked up by the image element, and a controller for computing contrast value under the luminance signals of each pixel extracted by the image processor, for computing moving quantity of the focus lens by using inverse number of the contrast value, and for controlling the drive means according to the moving quantity.

10 Claims, 5 Drawing Sheets

APPARATUS AND A METHOD FOR AUTOMATICALLY FOCUSING ON A SUBJECT

BACKGROUND OF THE INVENTION

1. Field of the Invention

This invention relates to an automatic focusing apparatus for camera, such as a video camera, an electronic camera, and so on.

2. Description of the Related Art

An apparatus for automatically focusing on a subject is disclosed in Japanese patent application number 4-6413 (Publication number 5-191708 published Jul. 30, 1993).

In this related art, a process circuit extracts a luminance signal from a picture signal picked up by a CCD via a lens system, and a contrast detection section detects a contrast of each image from the luminance signal. Then a focus drive circuit forwards a position of a lens system in a close end direction by a movement in response to a depth of field and when the contrast is larger than a value at a point before the movement, the circuit retracts the lens system position in the infinite end direction and uses a point at which a focal point is placed within a range of a depth of field as a focal position by the lens system.

However, a problem encountered with this prior art apparatus is that the focus drive circuit has to forward and retract a position of a lens system repeatedly. In addition, the focus drive circuit reduces with predetermined fixation ratio the range of the movement of the lens system gradually in order to place the focal point within a range of a depth of field. Consequently, the apparatus needs a lot of time until the focal point is placed within a range of a depth of field as a focal position by the lens system. Therefore, the apparatus can not focus on a subject quickly.

SUMMARY OF THE INVENTION

Accordingly, it is an object of the present invention to focus on a subject quickly by omitting a waste of a lens system's operation.

Another object of the invention is to stop the lens system at the closest possible position to a focal point.

Still another object of the invention is to provide an apparatus that an external device receiving an image data does not need to distinguish whether the image data is in focus or not.

The present invention is an automatic focusing apparatus for automatically focusing on a subject in an image plane. The automatic focusing apparatus includes a focus lens for focusing on the subject, drive means for moving the focus lens, an image element for picking up image data from the subject through the focus lens, an image processor for extracting luminance signals of each pixel from the image data picked up by the image element, and a controller for computing contrast value under the luminance signals of each pixel extracted by the image processor, for computing moving quantity of the focus lens by using inverse number of the contrast value, and for controlling the drive means according to the moving quantity.

DETAILED DESCRIPTION OF THE PREFERRED EMBODIMENTS

Figure 1:
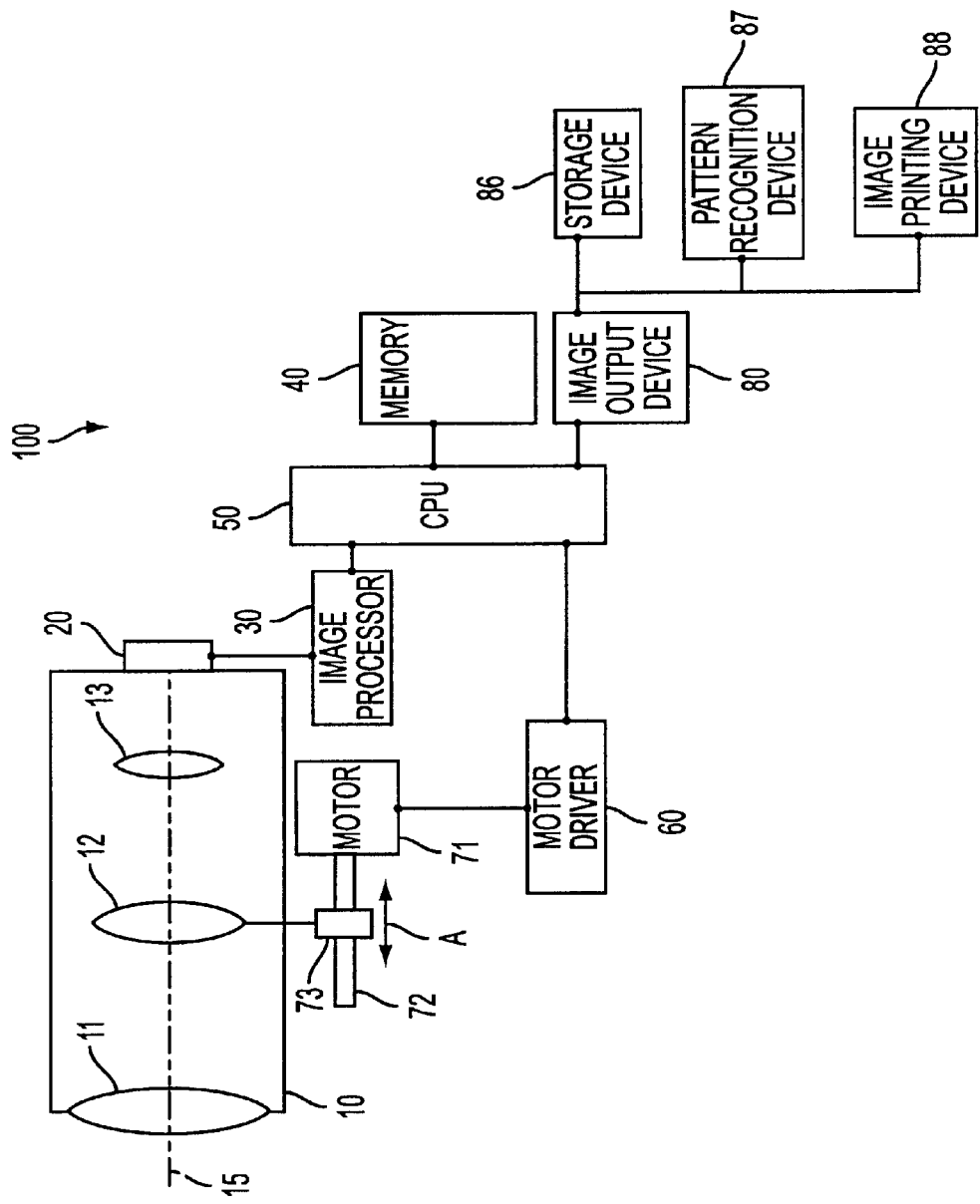
FIG. 1 is a block diagram of an automatic focusing apparatus of the present invention.

Referring to FIG. 1, there is shown an automatic focusing apparatus 100 which creates an image of a subject for photography passed through a lens system 10, consisted of a first lens 11, a focus lens 12 and a second lens 13 on an image element 20. The first and second lenses 11 and 13 revise in an original image from an inverted image and the focus lens 12 focuses on the subject by moving toward an arrow A. The image element 20 picks up an image data via the lens system 10 from the image of the subject and an image processor 30 extracts luminance signals of each pixel from the image data, and a memory 40 stores the luminance signals.

A CPU 50 extracts a specific area 210 (shown in FIG. 2) from the image data according to a program stored in the memory 40 and calculates a contrast value X in the specific area 210. Then the CPU 50 carries out a calculation of a moving range of the focus lens 12 and sends commands regarding range and direction for rotating a motor 71 to a motor driver 60. The motor driver 60 drives the motor 71 according to the CPU 50. A slider 73 supporting the focus lens 12 and a screw 72 is installed on the motor 71, and the focus lens 12 is moved toward a focal point M by rotating the screw 72. When the focus lens 12 reaches the focal point M by the motor 71, the motor driver 60 sends a signal for informing a termination of operation to the CPU 50, and the CPU 50 stops to send commands to the motor driver 60.

Next, it is explained in detail about a mechanism in order to move the focus lens 12. The CPU extracts the specific area 210 from the image data according to the program stored in the memory 40. Then the CPU 50 calculates difference of the luminance signal in adjacent pixels and the result is raised to the Mth power. The above-mentioned calculation is executed by all of pixel and these results are all added. The sum total is stored in the memory 40 as the contrast value X.

Figure 2:
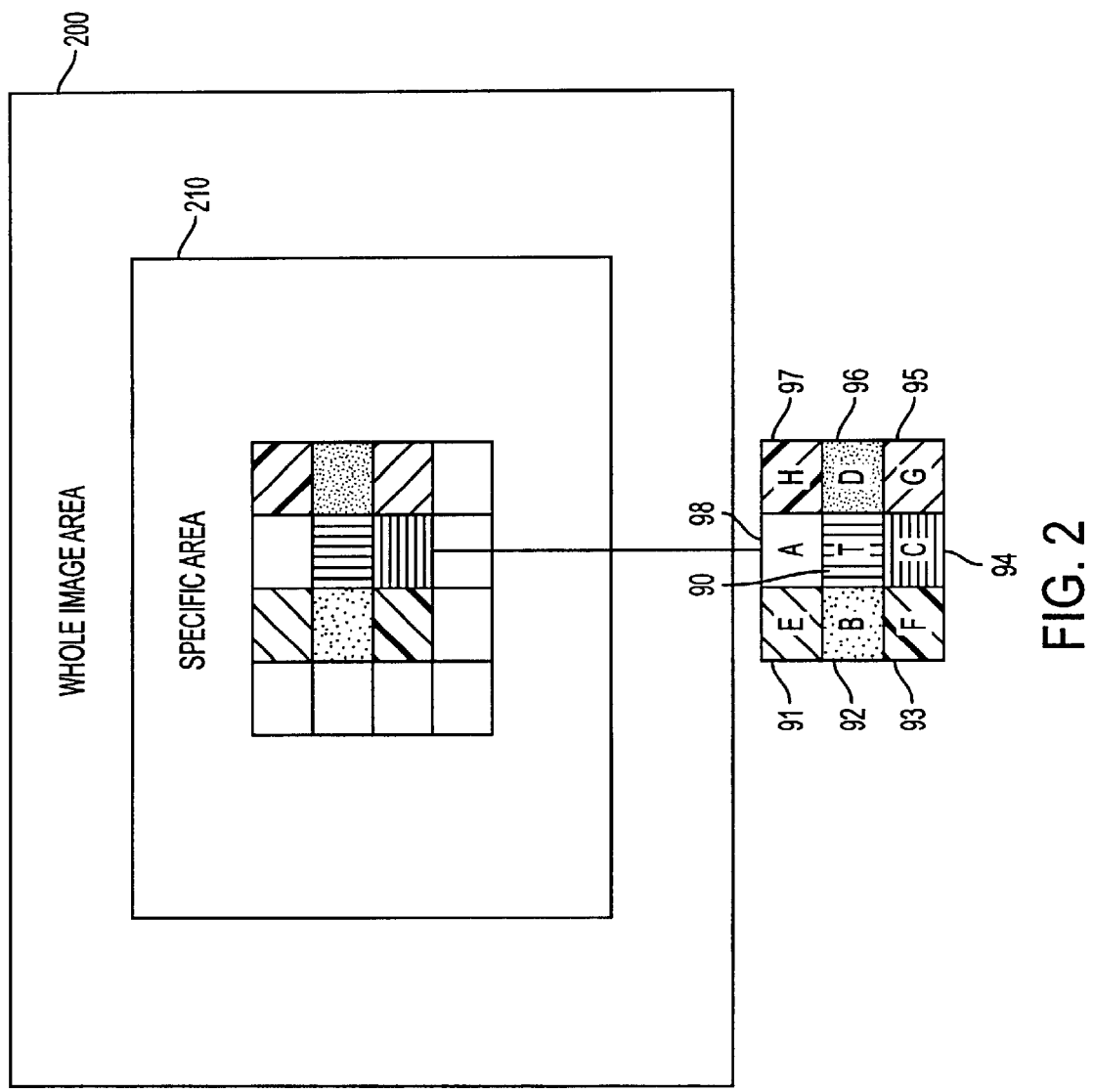
FIG. 2 is a view illustrating a image picked up by an image element shown in FIG. 1.

Referring to FIG. 2, it explains a method for calculating the contrast value X in the specific area 210.

The CPU 50 extracts the specific area 210 from a whole image area 200 to calculate the contrast value, and the location and size of the specific area 210 is extracted from the whole image area 200 optionally. For example, if the whole image area 200 has 640*480 pixels, the specific area 210 has 638*478 pixels because it is one pixel smaller in all directions than the whole image area 200. Generally, there are various unevenness and color variations on the surface of the subject, and the shading of the subject changes by circumstances, for example, the change of brightness surrounding subject. Therefore, the program is set up so that the CPU 50 extracts the specific area 210 that is not influenced by circumstances.

After the specific area 210 is extracted, the CPU 50 calculates each contrast value to the pixel T(n) from the pixel T(1) comprising of the specific area 210 (k=1 through n). For example, the contrast value $X_T$ of the pixel T90 is computed by using the following equation:

$$X_T = (A-T)^m + (B-T)^m + (C-T)^m + (D-T)^m \qquad (1)$$

In the above-mentioned equation, the variable $X_T$ is the contract value of the pixel T and the variables A, B, C, D and T are dimensions of the luminance signal of the pixels A98, B92, C94, D96 and T90. Further, the pixels A98, B92, C94, and D96 are selected from eight pixels A98, B92, C94, D96, E91, F93, G95 and H97 surrounding the pixel T90. And the variable m is an even number that is set up optionally according to an inclination of a curve of the contrast value.

Figure 5:
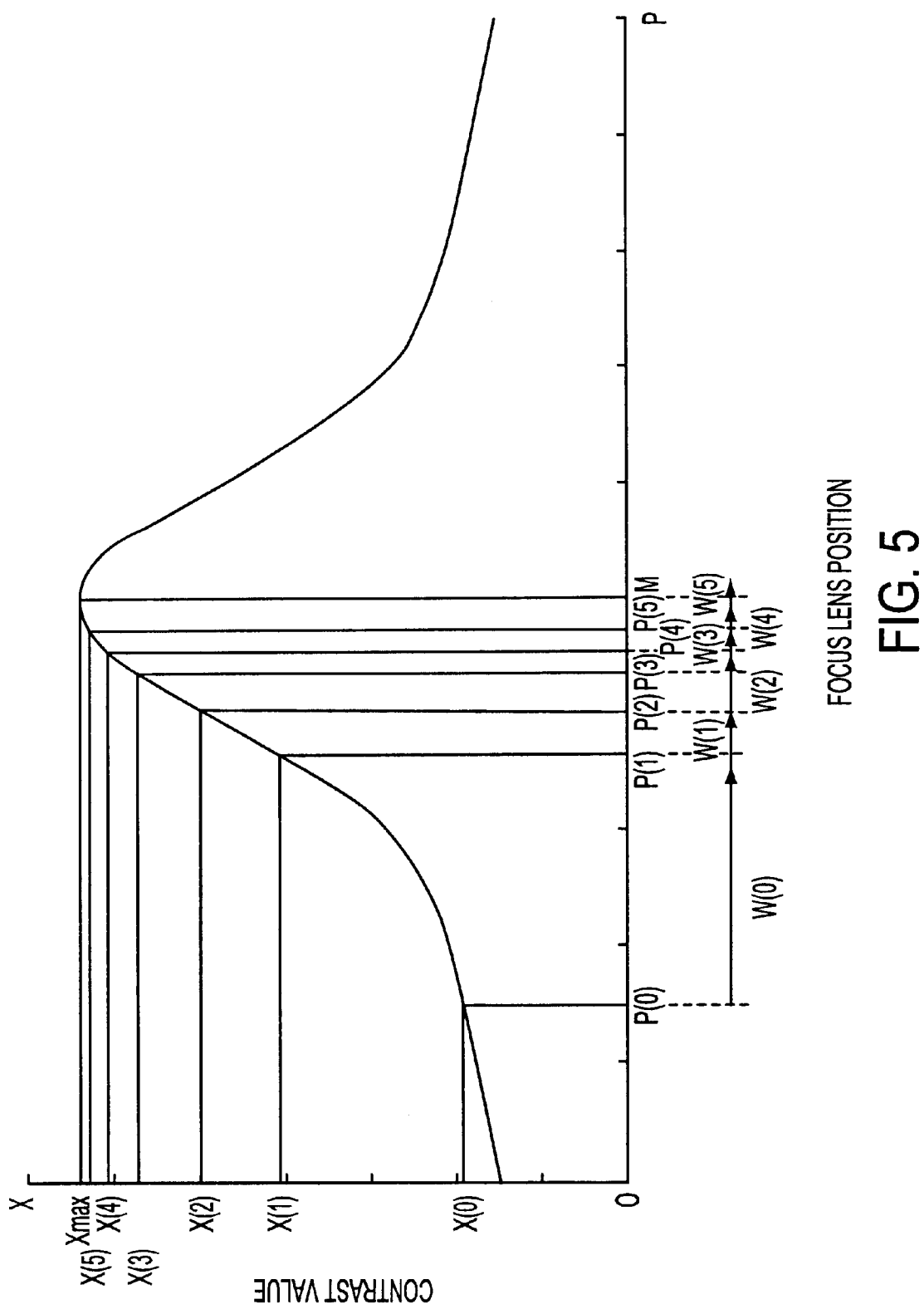

Further, if the scale of the variable m is enlarged, the inclination of the curve of the contrast value shown in FIG. 5 is enlarged, too, and the movement quantity of the focus lens 12 is computed easily. However, the variable m is set up by considering circumstances because it takes much time in order to compute the contrast value $X_T$. In addition, since the equation (1) uses subtractions, the variable m has to be an even number, for example four.

Each contrast value $X_T$ (k) is also computed from pixel T(1) to pixel T(n). Finally, the total contrast value X adding each contrast value $X_T$(k) is computed by the following equation:

$$X=\Sigma X_T(k) \qquad (2)$$

If the whole image area 200 is 640*480 pixels and the specific area 210 is 100*100 pixels, the number of pixels for computing the contrast value $X_T$(k) is 100*100 pixels, and the variable k of the above equation (2) becomes 100*100= 10000.

Figure 3:
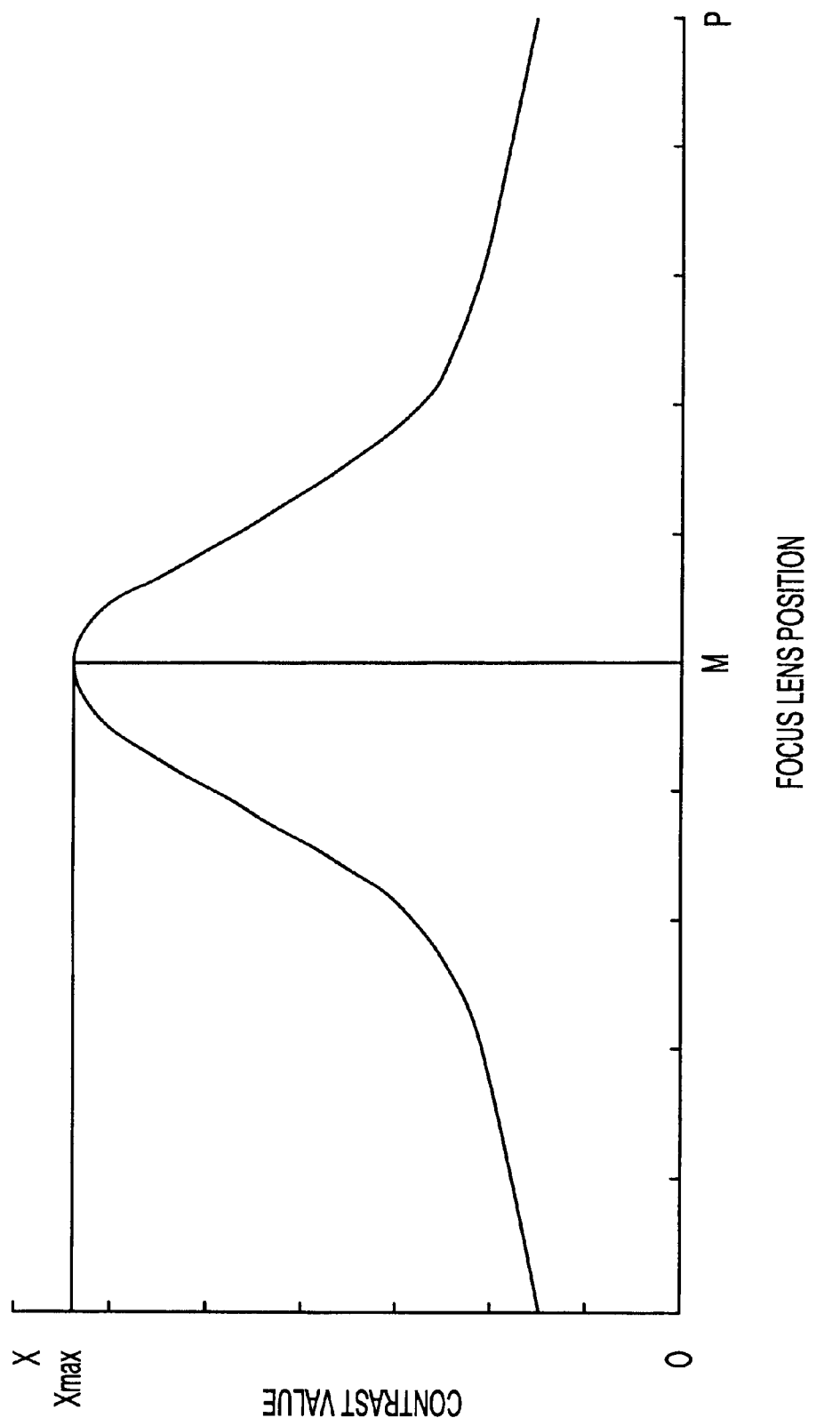
FIGS. 3 and 5 are a graph illustrating the forces of contrast values and how they relate to focus lens positions within the implementation according to FIG. 1.
Figure 4:
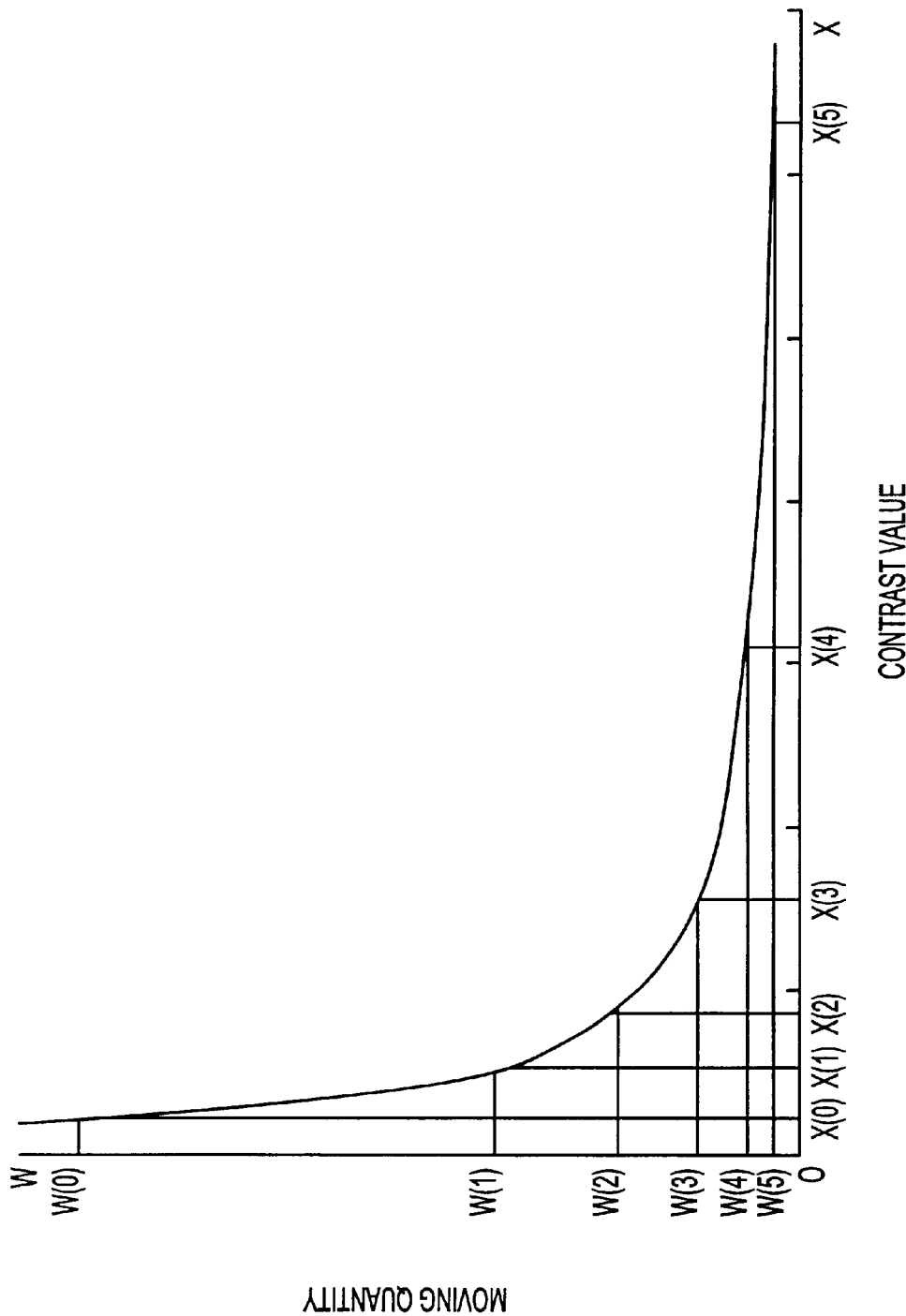
FIG. 4 is a graph illustrating the movement amount of the contrast values and how they relate to the contrast value within the implementation according to FIG. 1.

Referring to FIGS. 3, 4 and 5, it is explained how the, CPU 50 computes the moving quantity of the focus lens 12.

If the location of the focus lens 12 is closer to the focal point M, the contrast value X becomes bigger. If the location of the focus lens 12 is on the focal point M, the contrast value X becomes the maximum value Xmax. Therefore, the moving quantity W of the focus lens 12 is computed by the following equation:

$$W=G/X \qquad (3)$$

Further, the variable G is defining an inclination of a curve showed in FIG. 4 and is a fixed number not related to the contrast value. In addition, the variable G is set up optionally according to the shading of the subject. Further, the focus speed can be sped because the inclination of curve shown in FIG. 4 becomes big, if the variable G is enlarged.

Referring to FIG. 4, it is shown the moving quantity W of the focus lens 12 computed by the above equation (3). The moving quantity W becomes big value because the contrast value X is small as focus lens 12 is far from focal point M. But on the other hand, the moving quantity W becomes small value because the contrast value X is big as focus lens 12 is close to focal point M. Thus, the focus lens 12 moves largely toward the focal point M when the focus lens 12 starts on moving, and the moving quantity W of the focus lens 12 is small as it approaches the focal point M.

Referring to FIG. 5, it is explained how the focus lens 12 moves to the focal point M. Further, the horizontal axis means the position P of the focus lens 12 and the vertical line means the contrast X.

First of all, the CPU 50 computes a contrast value X(0) by using the above equation (1) and (2) under image data picked up on an initial position P(0) of the focus lens 12. The CPU 50 stores the computed contrast value X(0) in a memory 40 and executes the first moving of the focus lens 12. The memory 40 stores previously data related in the moving direction D(0) and quantity W(0) of the focus lens 12. The CPU 50 reads the moving direction D(0) and quantity W(0) stored in the memory 40 and directs them to the motor driver 60. The motor driver 60 drives a motor 71 according to the moving direction D(0) and quantity W(0), and moves the focus lens 12 toward an optical axis 15. After the focus lens 12 executes the first moving, the focus lens 12 is put on the position P(1) shown by the following equation:

$$P(1)=P(0)+W(0) \qquad (4)$$

Further, the variable P(0) is the initial position and the variable W(0) is the moving quantity.

After finishing the moving of the focus lens 12, the motor driver 60 transmits the signal that informs the CPU 50 of the finish of the moving. At this time, each value P(1), X(0), W(0) and D(0) are stored in the memory 40.

Next, the CPU 50 computes the contrast value X(1) under the image data picked up through the focus lens 12 lying on the position P(1) and computes the second moving quantity W(1) under the computed contrast value X(1). The CPU 50 decides the direction D(1) for moving the focus lens 12 by comparing the computed second contrast value X(1) with the first contrast value X(0) stored in the memory 40. If the result is X(0)<X(1), the direction D(1) is the same as the direction D(0). If the result is X(0)>X(1), the direction D(1) is oppositely to the direction D(0).

Further, a minimum moving quantity Wmin of the focus lens 12 is stored previously in the memory 40 and the CPU 50 compares the moving quantity W(1) with the minimum moving quantity Wmin. If the comparison result is W(1) >Wmin, the CPU 50 moves the focus lens 12 according to the moving quantity W(1). If the comparison result is W(1)<Wmin, the CPU 50 transmits the command in order to cancel the moving of the focus lens 12 to the motor driver 60. In other words, if the moving quantity W(1) is smaller than the moving quantity W(0), the CPU 50 regards the focus lens 12 as reaching the focal point M and stops the moving of the focus lens 12.

In this embodiment, the moving quantity W(1) is bigger than the moving quantity W(0) and the contrast value X(0) is smaller than the contrast value X(1). Therefore, the focus lens 12 is moved according to the moving quantity W(1) and to the same direction as the direction D(0). After the second moving, the focus lens 12 is put on the position P(2) that is a value adding the position P(1) to the moving quantity W(1). That is, the position P(2) is shown by the following equation:

$$P(2)=P(1)+W(1) \qquad (5)$$

After finishing the moving of the focus lens 12, the motor driver 60 transmits the signal that informs the CPU 50 of the finish of the moving. At this time, each value P(2), X(1), W(1) and D(1) are stored in the memory 40.

And then, the focus lens 12 is moved to the moving quantity W(4) from the moving quantity W(1) in order according to the curve of the contrast value (FIG. 5). That is, the contrast value X(n) and moving quantity W(n) is computed and the contrast value X(n) is compared with the contrast value X(n−1) and the moving quantity W(n) is compared with the moving quantity Wmin and these processes is repeated until the variable n becomes 4.

Finally, when the moving quantity W(n) is smaller than the moving quantity Wmin, the CPU 50 regards the focus lens 12 as reaching the focal point M and stops the moving of the focus lens 12. At this time, the apparatus 100 can pick up the image data that is in focus. Further, the moving quantity Wmin is the minimum moving quantity of the focus lens 12 limited mechanically by the motor driver 60.

The memory 40 stores the programs needed to execute the above process, and the CPU 50 reads the programs from the memory 40 and executes a calculation.

As mentioned above, the focus lens 12 does not need operations for forwarding and retracting repeatedly since the focus lens 12 never crosses the focal point M in the present invention. In addition, the calculation for the moving quantity is simple and easy. Therefore, the focus lens 12 can be put on the focal point M quickly.

Further, even if the subject moves in the middle of the moving of the focus lens 12, the top of the curve shown in FIG. 3 is merely moved. Thus, the focus lens 12 can be moved stably because the moving quantity W (=G/X) is not influenced. In addition, the focus lens 12 has the only condition that the depth of field is bigger than the moving quantity of the focus lens 12, but the focus lens 12 can be set up freely concerning other condition, for example, diaphragm quantity or focal length. Therefore, the present invention provides a compact and economical automatic focusing apparatus used in a video camera and electronic camera because the specifications of the focus lens 12 can be set up freely. Especially, the apparatus suits a camera for taking an image while approaching to a subject, such as an iris camera for taking an iris of person.

When the focus lens 12 reaches the focal point M, that is, when the moving quantity W(n) is smaller than the moving quantity Wmin, the apparatus can pick up the image data that is in focus. A program for adding a discrimination data to the image data is stored in the memory 40. Further, the discrimination data means that the moving quantity of the focus lens is smaller than the minimum moving quantity. That is, the discrimination data means that the subject is in focus. After the CPU 50 transmits the command in order to cancel the moving of the focus lens 12 to the motor driver 60, the CPU 50 reads the program from the memory 40.

Next, referring to FIG. 1, an image output device 80 reads an image data from the memory 40 and transmits the image data to external devices, for example a storage device 86 and pattern recognition device 87 and image printing device 88, registered in the memory 40. In an above-mentioned example, the image data is transmitted to the external device registered in the memory 40, but the image output device 80 may transmit the image data to the external device requesting the image data.

As mentioned above, the external device does not need to judge whether the image data is in focus because the discrimination data is added to the image data. Therefore, the external device does not need a special component for judging whether the image data is in focus. In addition, since a clear image data is transmitted to external devices from the image output device, the image data is useful to execute pattern recognition, image recording and image printing. Especially, the apparatus in the present invention is suitable for the pattern recognition device since a pattern recognition device recognizes various data, for example an iris, a face, fingerprints and bar code.

We claim:

1. An apparatus for automatically focusing on a subject in an image plane, comprising:

a focus lens for focusing on the subject, drive means for moving the focus lens, an image element for picking up image data from the subject through the focus lens, an image processor for extracting luminance signals corresponding to each pixel from the image data, and a controller for computing a contrast value under the luminance signals, for computing a moving quantity of the focus lens by using an inverse number of the contrast value, and for controlling the drive means according to the moving quantity, wherein the moving quantity of the focus lens is computed such that the focus lens is never moved past a focal point for the subject.

2. An apparatus according to claim 1, wherein the contrast value is computed under the luminance signals corresponding to pixels on a specific area extracted from the whole image data.

3. An apparatus according to claim 1, wherein the controller drives the drive means until a moving quantity of the focus lens becomes smaller than a minimum moving quantity limiting the moving of the focus lens.

4. An apparatus according to claim 3, wherein the controller adds discrimination data to the image data, the discrimination data meaning that the moving quantity of the focus lens is smaller than the minimum moving quantity.

5. An apparatus according to claim 3, further comprising an image output device for outputting the image data to an external device.

6. An apparatus according to claim 5, wherein the external device is a storage device.

7. An apparatus according to claim 5, wherein the external device is a pattern recognition device.

8. An apparatus according to claim 5, wherein the external device is an image printing device.

9. A method for automatically focusing on the subject in an image plane, comprising the steps of:

picking up image data from the subject by an image element through a focus lens, extracting luminance signals of each pixel from the image data picked up by the image element, computing a contrast value under the extracted luminance signals, computing moving quantity of the focus lens by using an inverse number of the contrast value, wherein the moving quantity of the focus lens is computed such that the focus lens is never moved past a focal point for the subject, and moving the focus lens according to the moving quantity.

10. A method according to claim 9, wherein the focus lens is moved until a moving quantity of the focus lens becomes smaller than a minimum moving quantity limiting the moving of the focus lens.

* * * * *